United States Patent [19]

Takaoka et al.

[11] 4,139,290
[45] Feb. 13, 1979

[54] LENS STOP AUXILIARY BRAKE CONTROL DEVICE IN AUTOMATIC EXPOSURE CAMERA OF THE LENS STOP VALUE CONTROL TYPE

[75] Inventors: Yukio Takaoka, Asaka; Yoshio Sawada, Tokyo, both of Japan

[73] Assignee: Asahi Kogaku Kogyo Kabushiki Kaisha, Tokyo, Japan

[21] Appl. No.: 874,084

[22] Filed: Feb. 1, 1978

[30] Foreign Application Priority Data

Feb. 28, 1977 [JP] Japan .............................. 52-24211[U]

[51] Int. Cl.² .......................... G03B 7/08; G03B 9/06
[52] U.S. Cl. ....................................... 354/43; 354/271
[58] Field of Search ................... 354/23 R, 31, 36, 38, 354/40, 43, 48, 50, 60 R, 237–239, 270, 271, 29, 30; 352/141

[56] References Cited

U.S. PATENT DOCUMENTS

| 3,657,987 | 4/1972 | Babcock et al. | 354/43 X |
| 3,757,655 | 9/1973 | Kobayashi et al. | 354/29 |
| 3,820,131 | 6/1974 | Tanaka | 354/38 |
| 3,921,186 | 11/1975 | Lermann | 354/43 |

*Primary Examiner*—L. T. Hix
*Assistant Examiner*—William B. Perkey
*Attorney, Agent, or Firm*—Sughrue, Rothwell, Mion, Zinn and Macpeak

[57] ABSTRACT

An auxiliary brake control device for use in an automatic exposure camera of the lens stop value control type permits the lens stop operation to be controlled with high accuracy without substantially increasing the lens stop operation time. The auxiliary brake control device is controlled by comparing the variation rate in the measured light which passes through the lens stop with a preset value. In this way, lenses which have different characteristic variation rates can be freely interchanged.

1 Claim, 11 Drawing Figures

LENS STOP AUXILIARY BRAKE CONTROL DEVICE IN AUTOMATIC EXPOSURE CAMERA OF THE LENS STOP VALUE CONTROL TYPE

BACKGROUND OF THE INVENTION

This invention relates to a lens stop auxilairy brake control device in an automatic exposure camera of lens stop value control type.

An automatic exposure camera of lens stop control type is known in the art in which while the lens is being stopped from its fully open state, the light from the object to be photographed, which has passed through the aperture of the lens stop, is measured, and when the lens is stopped to a value suitable for a predetermined shutter speed $T_V$ and a film sensitivity $S_V$, the lens stopping operation is suspended thereby automatically determining the aperture of the lens stop. If in this conventional camera the lens stopping operation is effected with the lens only, then the operating period of time required for stopping the lens from its fully open state is too short to accurately lock the lens stop. Therefore, a slow speed mechanism is provided in association with an operating member actuated by the lens stopping operation.

However, in general, the amount of movement of the lens stop release plate is small with respect to a lens stop value on the minimum lens stop value side. Therefore, even if such a slow speed mechansim as to move the lens stop release plate at an approximately constant speed is employed, the quantity of light is abruptly changed in the vicinity of the minimum lens stop value. Accordingly, when the lens stop releases plate is moved at an approximately constant speed, it is necessary to make the period of time required for stopping the lens from its fully open state sufficiently long. Otherwise, time per exposure value $E_V$ becomes extremely short, and therefore it is difficult to precisely control the lens stopping operation. However, if the entire operating time is made sufficiently long, then the period of time of from the camera release to the shutter operation start is increased, which leads to a delay in exposure. Furthermore, in some cameras the travelling of the lens stop release plate is abruptly changed, and in some cameras it is not so changed. Thus, depending of the type of camera, the travelling condition of the lens stop release plate is different. Therefore, in the case when the lens is replaced by a different one, the accuracy in control will be lowered if the camera is such that the travelling of the lens stop release plate is abruptly changed.

SUMMARY OF THE INVENTION

In view of the foregoing, an object of this invention is to provide a mechanism in which although the entire operating time is relatively short, the lens stop operation can be controlled with high accuracy. This accomplished by providing an auxiliary brake control device which acts on the slow speed mechanism only during the period of time when the lens stopping operation occurs for small lens apertures. Thus, for the larger lens apertures, the slow speed mechanism operates in the normal manner, but as the lens apertures become smaller, the auxiliary brake control device acts on the slow speed mechanism to further slow the lens stopping operation.

DESCRIPTION OF THE PREFERRED EMBODIMENT

Figure 1:
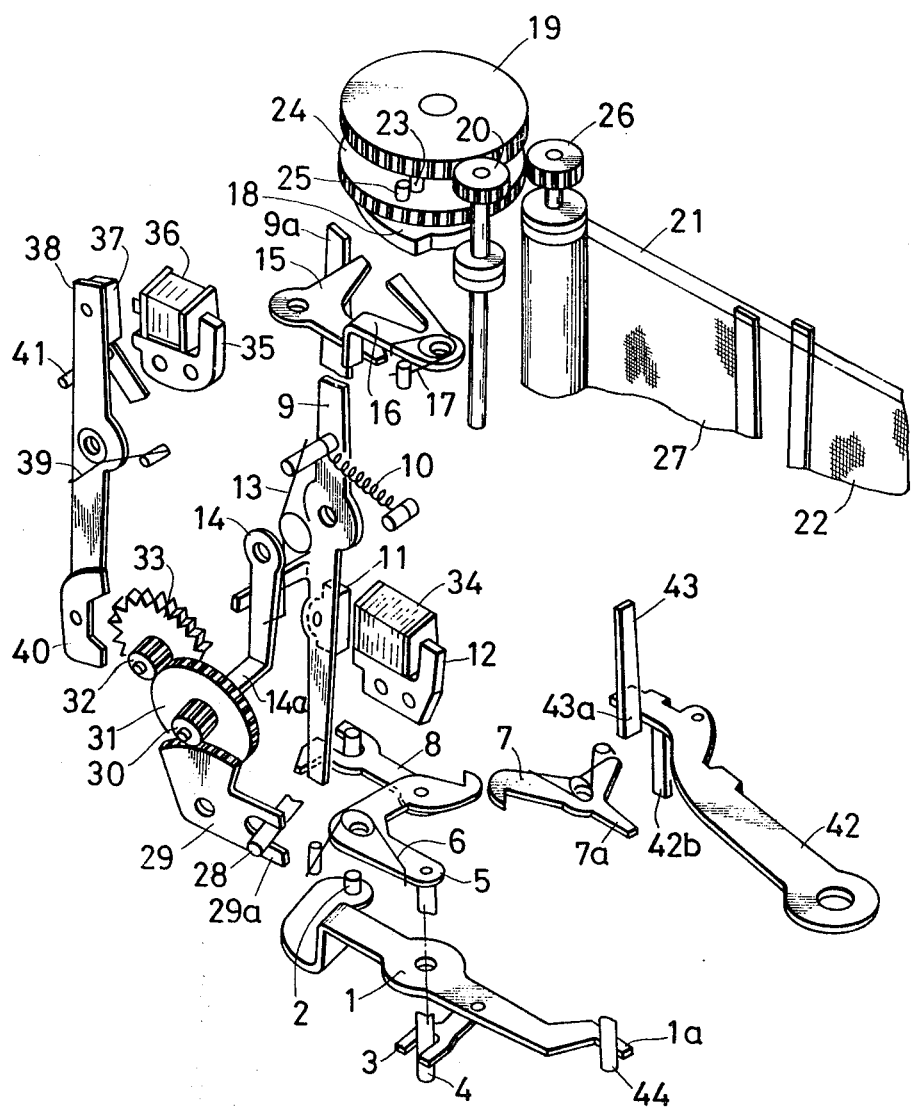
FIG. 1 is a perspective view showing a lens stop control section and a top curtain locking section according to this invention.

FIG. 1 shows the constructions of a lens stop value control mechanism, an auxiliary brake mechanism, and a top curtain release device before being wound. A charge lever 1 is abutted against the cam of a winding mechanism (not shown), and is turned clockwise by the winding operation, while a set lever 5 pivoted on pin 2 is turned clockwise against the elastic force of a spring 6 through a pin 4 by a fork-shaped lever 3 rotatably secured to the charge lever 1, as a result of which an auxiliary set lever 8 rotatably secured to the set lever 5 is displaced to the right as viewed in the figure to cause an operating lever 9 to turn counter-clockwise against the elastic force of a spring 10. Therefore, an armature 11 pivotally mounted on the lever 9 is brought into contact with the iron core 12 of a lens stop control magnet 34 secured to the camera body, while a ratchet pawl 14 elastically coupled through a spring 13 to the lever 9 is also turned counter-clockwise, as a result of which the locking part 14a of the ratchet pawl 14 is disengaged from the ratchet wheel 33 at the final stage of a slow speed mechanism. Furthermore, as the one end portion 9a of the operating lever 9 is displaced, a top curtain locking lever 16 is turned clockwise through a relay lever 15 by means of a spring 17 so as to be ready for engaging a top curtain locking cam 18. Similarly, an anchor lever 38 is turned clockwise against the elastic force of a spring 39 by a pin 41 embedded in a lever (not shown) engaged with the auxiliary set lever 8. As a result, an armature 37 pivotally mounted on the anchor lever 38 is brought into contact with the iron core 35 of an auxiliary brake magnet 36, and an anchor 40 is moved away from the ratchet wheel 33. When the armatures 11 and 37 are in contact with the iron cores 12 and 35, respectively, the set lever 5 is engaged with the locking lever 7. The winding cam is so designed that the rotational displacement of the charge lever 1 is maximum. Furthermore, the winding cam is so designed that the charge lever 1 is restored by being turned counter-clockwise in the winding operation effected thereafter.

Therefore, the fork-shaped lever 3 is restored leaving the pin 4.

By the winding operation, an upper speed change gear 19 engaged with a gear in the winding mechanism (not shown) is turned, and a top curtain 22 is wound, or charged, through a pulling member 21 by means of a top curtain pinion 20 engaged with the speed change gear 19. A lower speed change gear 24 is turned by means of a pin 23 embedded in the gear 19 and a pin 25 embedded in the gear 24 so that the bottom curtain 27 is wound, or charged, by a bottom curtain pinion 26. The top curtain locking cam 18 integral with the upper speed change gear 19, and the top curtain locking lever 16 are so arranged that they are engaged with each other upon completion of the winding operation.

Figure 2:
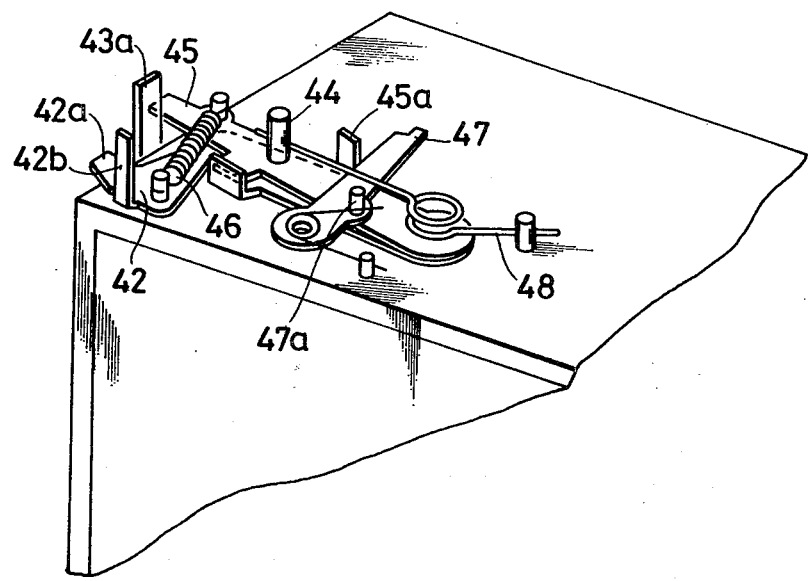
FIG. 2 is a perspective view showing the lower portion of a slow speed mechanism.

The charge lever 1 is turned clockwise by the winding operation. In this operation, as a pin 44 which is engaged with one end portion 1a of the charge lever 1 is fixedly secured to a driving lever 45 (FIG. 2), the driving lever 45 is turned clockwise while energizing a restoring spring 48 and a mirror lifting spring 46, and a locking portion 45a of the lever 45 is engaged with a second locking lever 47, thus completing the charging operation. When the driving lever 45 is turned clockwise, a first operating lever 42 is allowed to turn clockwise through the mirror lifting spring 46, and one end portion 43a of the second operating lever 43 is allowed to move to the right as viewed in FIG. 3 by one end portion 42a of the first operating lever 42. However, as the lever 43 is locked by a bent portion 57a of the first locking lever 57, the mirror lifting spring 46 is energized. On the other hand, a lens stop release plate 61 is energized in a lens stopping direction, or upward in FIG. 3, at all times, and a slide plate 59 engaged with the lens stop release plate 61 tends to move against the elastic force of a restoring spring 62. However, the slide plate 59 is retained by a bent portion 60a of a restoring lever 60. This restoring lever 60 is coupled through a coupling spring 50 to a lever 51, and a bent portion 51a of the lever 51 is locked by a third locking lever 52.

Referring again to FIG. 1, the slow speed mechanism is coupled by the coupling pin 28 to operate in association with the lens stop release plate (61 in FIG. 3) and the slide plate 59 on the lens side. Coupling pin 28 is engaged with an elongated slot 29a of a sector-shaped gear 29. This sector-shaped gear 29 is engaged with the first pinion gear 30, and its operation is transmitted through a spur gear 31 and the second pinion gear 32 to the ratchet wheel 33. The object of the slow speed mechanism is to increase the operational displacement of the lens stop release plate 61 so as to improve the control accuracy, and to reduce the locking force so as to improve the durability.

The aforementioned anchor 40 is disposed in such a manner as to confront the ratchet wheel 33 in the gear train. Furthermore, a one-way clutch is interposed between the first pinion gear 30 and the spur gear 31. When the coupling pin 28 is moved upward, the first pinion gear 30 and the spur gear 31 from one unit to turn the ratchet wheel 33, and in order to restore the lens stop to its fully open state when the ratchet wheel 33 is locked, the coupling pin 28 can be moved downward because of the one-way clutch.

Now, the operation of the camera will be described beginning at the release operation. In association with the depression of a release button (not shown) a release lever 53 is moved downward as viewed in FIG. 3, as a result of which the first locking lever 57 is turned clockwise and is disengaged from the second operating lever 43. Therefore, the first operating lever 42 is turned clockwise as viewed in FIG. 2 by the mirror lifting spring 46, as a result of which the second operating lever 43 is turned counter-clockwise as viewed in FIG. 3. A pin 58 fixedly secured to the second operating lever 43 is brought into contact with a cam-shaped portion 54a of a mirror lifting lever 54 to turn the lever 54 clockwise which turns counter-clockwise a mirror lifting gear 55 by means of a gear provided on the peripheral portion of the lever 54. As a result, a mirror (not shown) is moved upward. When the operation of the second operating lever 43 is ended, the bent portion 43b kicks the third locking lever 52 to turn the lever 52 clockwise to disengage the lever 51. As a result, the lever 51 and the restoring lever 60 are instantaneously turned counter-clockwise by means of the spring 56. Accordingly, the slide plate 59 retained by the restoring lever 60 starts moving upward to start stopping the lens. By the operation of the coupling pin 28, the slow speed mechanism shown in FIG. 1 starts its operation. On the other hand, while the set lever 5 is locked by the locking lever 7 because of the winding operation, the first operating lever 42 of the mirror box mechanism is turned by the release operation of the camera, whereupon one end portion 7a of the locking lever 7 is kicked by the bent portion 42b of the lever 42. As a result, the set lever 5 is released and is turned counter-clockwise by the spring 41 instantaneously. The operating lever 9 and the anchor lever 38 tend to turn; however, in this operation, as the lens stop control magnet 34 and the auxiliary brake magnet 36 have been energized, the armatures 11 and 37 are attracted to the iron cores 12 and 35, respectively, and therefore the rotation of the operation lever 9 and the anchor lever 38 is prevented.

Figure 4:
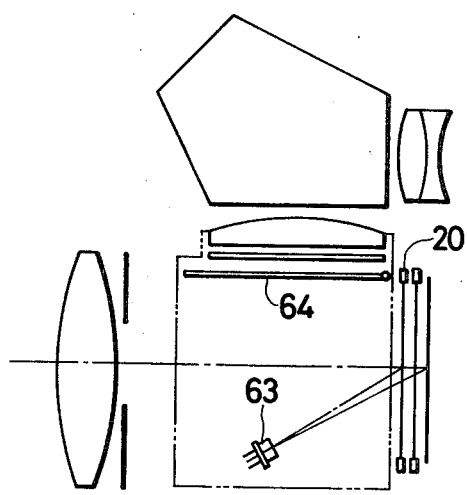
FIG. 4 is a sectional view showing an arrangement of a light receiving element.
Figure 3:
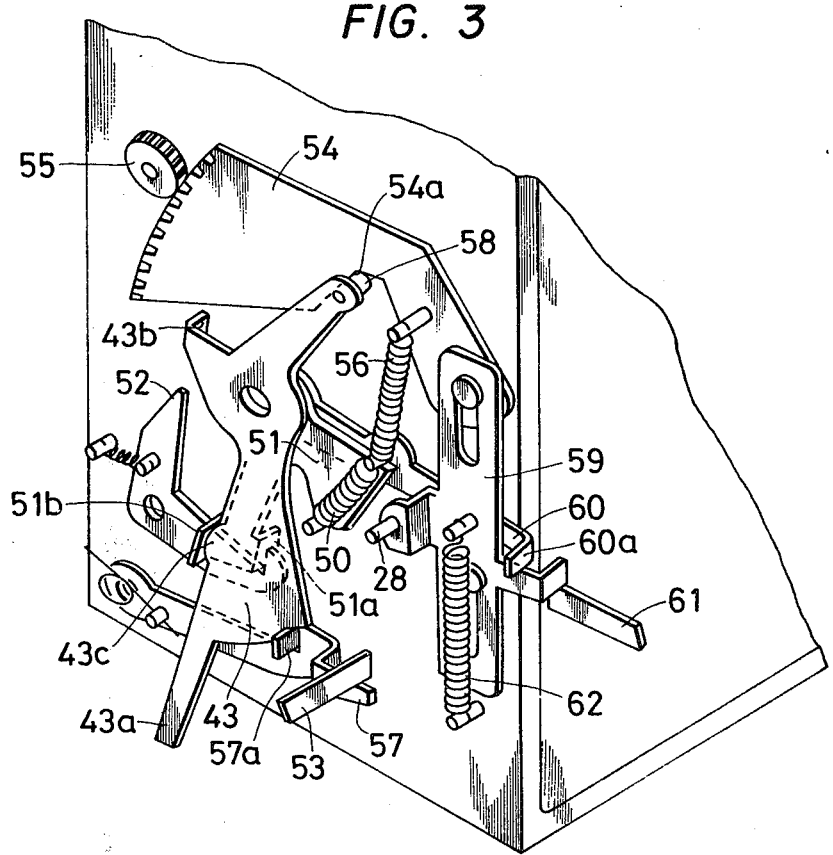
FIG. 3 is also a perspective view showing the side part of the slow speed mechanism.
Figure 5:
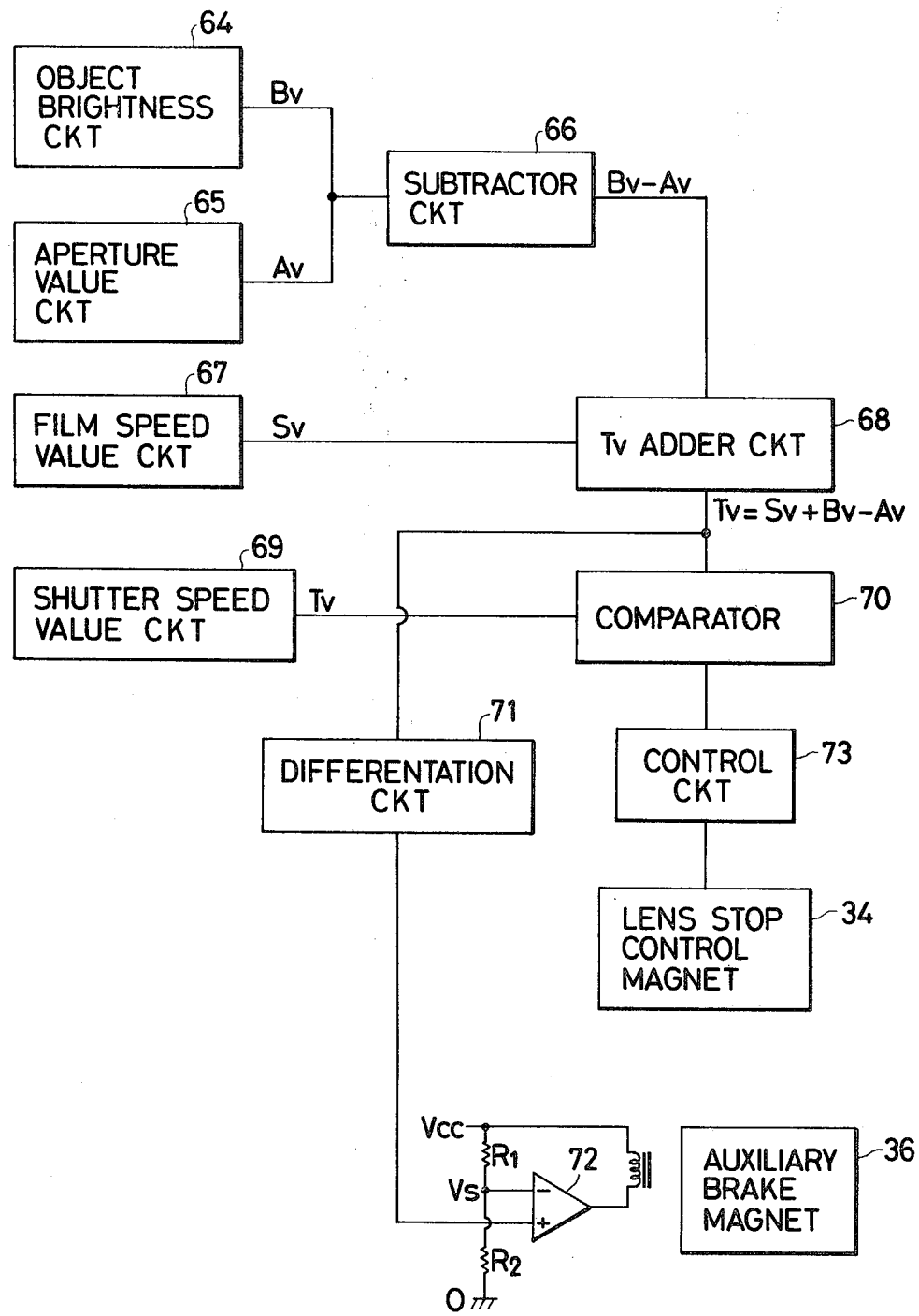
FIG. 5 is a block diagram illustrating a control circuit.

The lens stop value is controlled by receiving variations in the quantity of incident light. In FIG. 4 finder observing mirror 64 has been moved upward. A light receiving element 63 is disposed in the lower part of the mirror box and out of the photographing incident light path. A reflection treatment is applied to the photographing side of the top curtain 20, and the reflected light is intercetped by element 63. FIG. 5 is a block diagram showing a control circuit. An object brightness calculating circuit including the light receiving element 63 generates an output voltage proportional to the object brightness value $B_V$. An aperture value circuit 65 is connected to the lens stopping mechanism to provide an output voltage proportional to lens aperture value $A_V$. The difference between these two voltages is generated by the subtractor circuit 66, that is, the output voltage from circuit 66 is proportional to $B_V - A_V$. A film speed value circuit 67 provides a preset output voltage proportional to the film speed value $S_V$, and this voltage is combined with the output voltage from circuit 66 in an adder circuit 68 to generate a voltage proportional to $S_V + B_V - A_V$ which is equal to a shutter speed value $T_V$ computed according to the APEX equation. The computed shutter speed value $T_V$ varies with the value $B_V - A_V$ which varies at the lens is stopped. The output of adder 68 is compared with a voltage from shutter speed value circuit 69 which has been manually set to a desired shutter speed value $T_V$ in a comparator 70. Differentiation circuit 71 also receives the output of adder circuit 68 and provides an output proportional to a variation rate at all times. The output of the differentiation circuit 71 is compared with a reference voltage $V_S = V_{CC} \times R_2/(R_1 + R_2)$ obtained by a series circuit of resistors $R_1$ and $R_2$ in a comparator 72. When the output of differentiation circuit 71 coincides with the reference voltage $V_S$, the comparator 72 applies an "off" signal to the auxiliary brake magnet 36. Therefore, when the variation rate of the computed shutter speed value $T_V$ becomes equal to a set value as represented by the reference voltage $V_S$, energization of the auxiliary brake magnet 36 is suspended. As a result, attraction between the iron core 35 and the armature 37 is released, the anchor lever 38 is turned counter-clockwise by the spring 39 so that the anchor 40 engages the ratchet wheel 33 to apply an auxiliary brake force. Thus, the displacement of the diaphragm is slowed down as the lens is further stopped down. Finally, the computed value $T_V$ represented by the output of adder circuit 68 becomes coincident with the set value $T_V$ represented by the output of circuit 69. When both values coincide with each other in the comparator 70, the lens stop control magnet 34 is deenergized through a control circuit 73, as a result of which attraction between the iron core 12 and the armature 11 is released and the operating lever 9 is therefore turned clockwise by the spring 10. In this case, the elasticity coupled ratchet pawl 14 is also turned clockwise to engage ratchet wheel 33 in the slow speed mechanism. As a result, the operation of the lens stop release plate 61 is stopped by means of the coupling pin 28 and the slide plate 59 so that the lens is stopped at a correct lens stop value. The operating lever 9 is further turned clockwise to allow its one end portion 9a to kick the relay lever 15, as a result of which the top curtain locking lever 16 is disengaged from the top curtain locking cam 18 so that the top curtain 22 starts running. In a period of time set by an exposure time setting mechanism (not shown), the bottom curtain 27 starts running. When the bottom curtain running operation is ended, a lever (not shown) operating in association with the bottom curtain kicks the pin 47a fixedly secured to the second clocking lever 47 (FIG. 2) to turn the latter 47a clockwise, thereby disengaging the driving lever 45. As a result, the driving lever 45 is restored by means of the restoring spring 48, and the second operating lever 43 is also restored. Referring to FIG. 3, the protrusion 43c of the second operating lever 43 depresses the bent portion 51b of the lever 51, as a result of which the restoring lever 60 is restored by means of the coupling spring 50. Accordingly, the slide plate 59 is also restored, and therefore the lens stop is restored to its open state. In this case, although the slow speed mechanism has been locked, the one-way clutch is interposed between the first pinion gear 30 and the spur gear 31, and therefore the slide plate can be restored. Furthermore, the mirror lifting lever 54 is restored by the spring 56, and therefore the mirror is restored. Then, the lever 51 engages the third locking lever 52. Thus, all of the operations have been completed.

Figure 6:
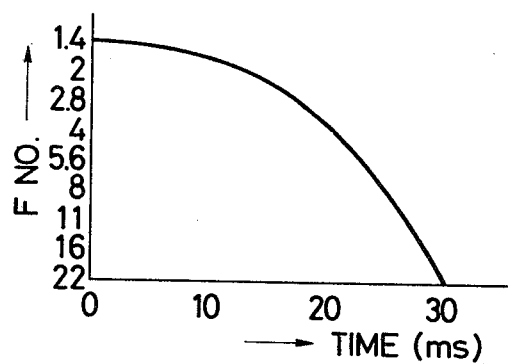
FIG. 6 is a graphical representation indicating variations in light quantity without an auxiliary brake.
Figure 7:
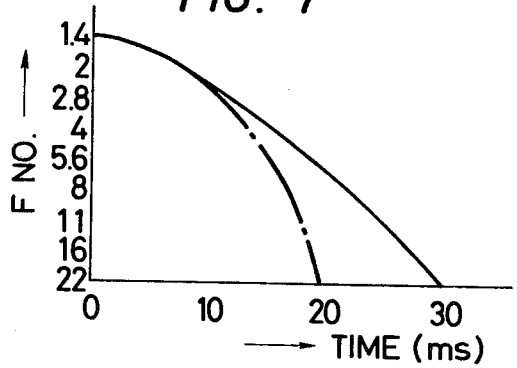
FIG. 7 is a graphical representation indicating variations in light quantity with the auxiliary brake.
Figure 8:
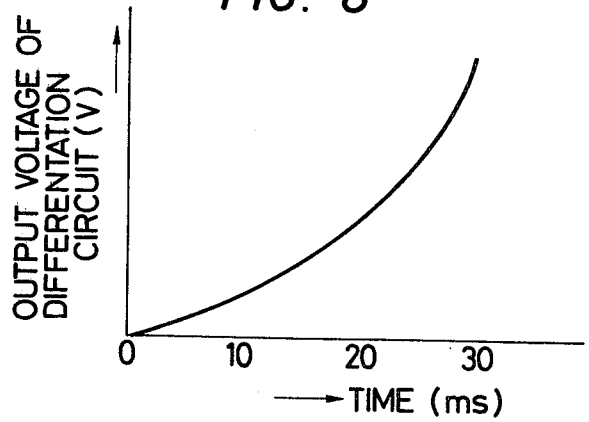
FIG. 8 is a graphical representation indicating the variation rates in FIG. 6.
Figure 9:
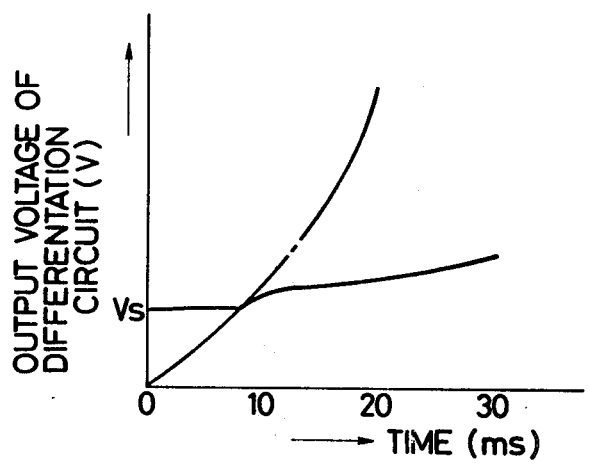
FIG. 9 is a graphical representation indicating the variation rates in FIG. 7.

FIGS. 6 and 7 are graphical representations indicating relationships between the lens stop values obtained by converting variations in light quantity of the light receiving element 63 and the lapse of time, with respect to the above-described lens stop control operation. FIGS. 8 and 9 are graphical representations indicating the variation rates of curves indicated in FIGS. 6 and 7, respectively.

Figure 10:
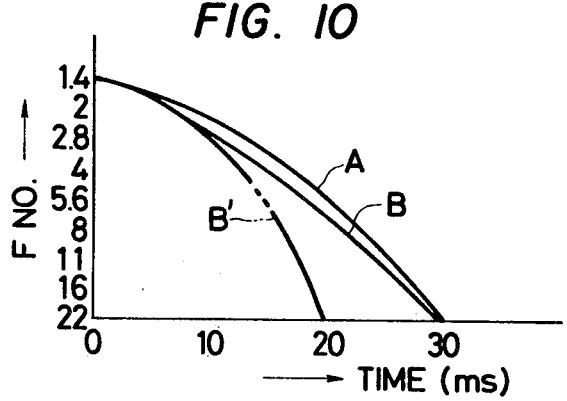
FIG. 10 is a graphical representation indicating variations in light quantity in the case when the lens is replaced by various other lenses.
Figure 11:
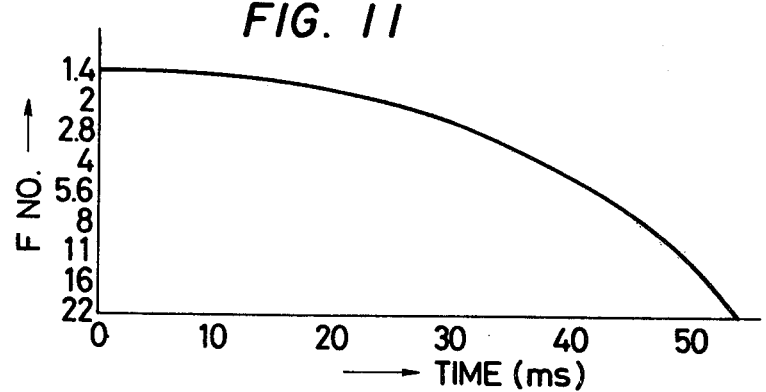
FIG. 11 is a graphical representation indicating variations in light quanity in the case where the auxiliary brake is provided from the beginning.

As one example, a lens of from F1.4 to F22 is employed. In the case of FIG. 6, a heavy slow speed mechanism is provided without an auxiliary brake, and the whole travelling time is 30 ms. The variations is great on the minimum lens stop value side, and it takes 1 ms from F16 to F22. If the operating time of the lens stop control magnet is deviated by 0.5ms, the control is not accurate. On the other hand, FIG. 7 is a graphical representation showing the operation according to the invention. At the point $V_S$ in FIG. 9, the auxiliary brake magnet is deenergized, and a light slow speed mechanism is used. In addition, an auxiliary brake force is applied to the slow speed mechanism which has been set as in curve A shown in FIG. 10, as a result of which curve B is obtained. In this case, it takes 2.5 ms traveling time from F16 to F22. Therefore, even if the operation time of the lens stop control magnet is deviated by 0.5 ms, the error is only 1/5 $E_V$. Thus, the control can be achieved with high accuracy. However, the entire traveling time is 30 ms, which is similar to that in the case of FIG. 6. Furthermore, in the invention, the auxiliary brake is applied on the basis of the computed shutter speed value variation rate. Therefore, in the case where the lens is replaced by another one, if the new lens has a variation characteristic whose curve is closer to a linear line (A in FIG. 10), no auxiliary brake is applied, and there is no loss in the entire traveling time. But if the lens has a variation characteristic whose curve is changed abruptly (B' in FIG. 10), the auxiliary brake is applied earlier, and the curve will be as indicated by B in FIG. 10. Thus, the control is effected with sufficiently high accuracy regardless of individual lens variation characteristics. Shown in FIG. 11 is the case where the auxiliary brake is applied from the beginning to increase a period of time per 1 $E_V$ on the minimum lens stop value side. In this case, the entire operating time is very long, i.e. about 55 ms. That is, the period of time from the shutter release to the start of the top curtain running operation is considerably long, which may cause a delay in exposure.

As was described above, in this invention, at the time of a preset variation rate in computed shutter speed value, the auxiliary brake magnet 36 is deenergized to apply the auxiliary brake. Therefore, although the entire operating time is short, the lens stop operation can be controlled with high accuracy.

What is claimed is:

1. A lens stop auxiliary brake control device for use in an automatic exposure camera of the lens stop value control type in which a slow speed mechanism operating in association with a lens stop operating member actuated by a lens stopping operation is provided and the operation of the slow speed mechanism is suspended by deenergizing a control magnet, said slow speed mechanism being made up of a train of gears to the shaft of one of which a ratchet wheel is fixedly secured, said auxiliary brake control device comprising:
   a brake magnet;
   a brake member for applying a brake force to said ratchet wheel by deenergizing said brake magnet;
   a light measuring circuit for measuring light from an object to be photographed which has passed through a lens stop;
   a differentiation circuit for differentiating with time an output of said light measuring circuit;
   a reference voltage generating circuit for generating a reference voltage; and
   a comparison circuit for comparing the output of said differentiation circuit with said reference voltage, so that when said output of the differentiation circuit coincides with said reference voltage in said comparison circuit, said brake magnet is deenergized so as to apply a brake force to said lens stop operating member through said ratchet wheel.

* * * * *